W. F. JACOBS.
ADJUSTING DEVICE FOR GRAIN DRILLS.
APPLICATION FILED JAN. 22, 1908.
914,843.
Patented Mar. 9, 1909.
2 SHEETS—SHEET 1.
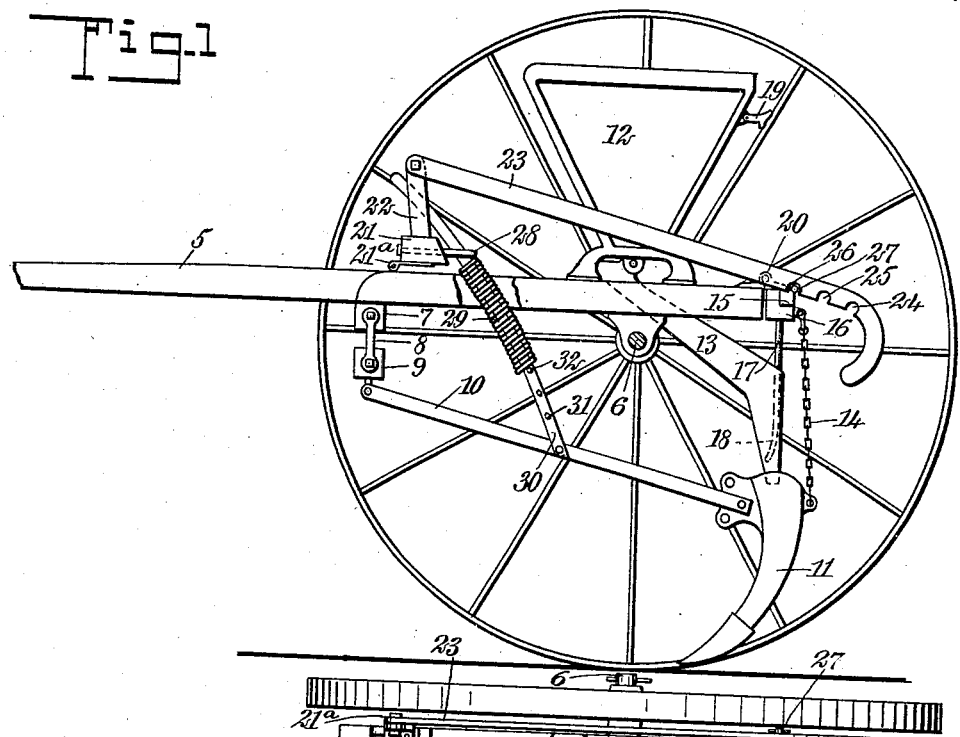
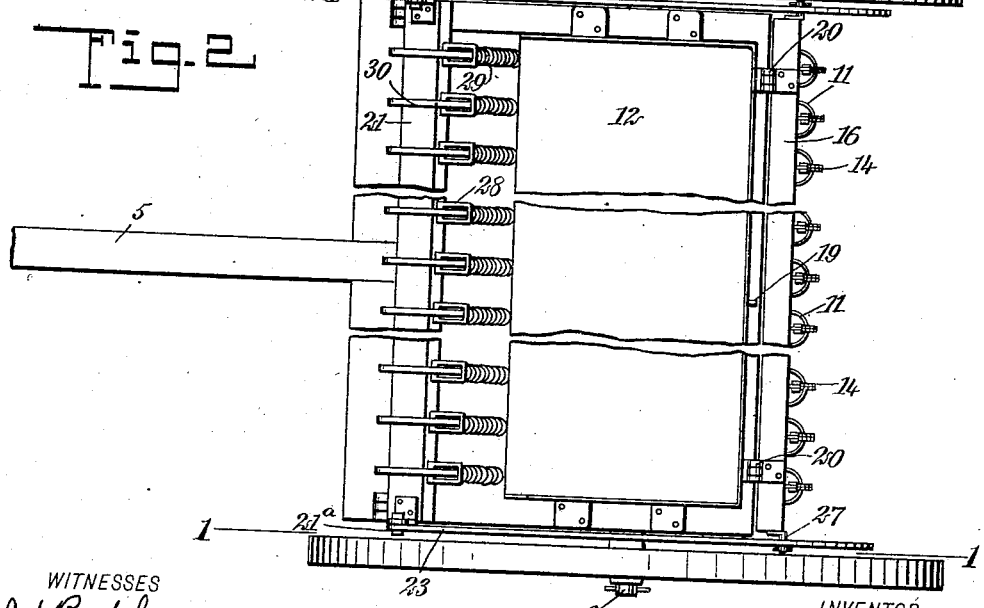
WITNESSES
J. A. Brophy
Walton Harrison
INVENTOR
William F. Jacobs
BY Munn & Co
ATTORNEYS.

W. F. JACOBS.
ADJUSTING DEVICE FOR GRAIN DRILLS.
APPLICATION FILED JAN. 22, 1908.
914,843.
Patented Mar. 9, 1909.
2 SHEETS—SHEET 2.
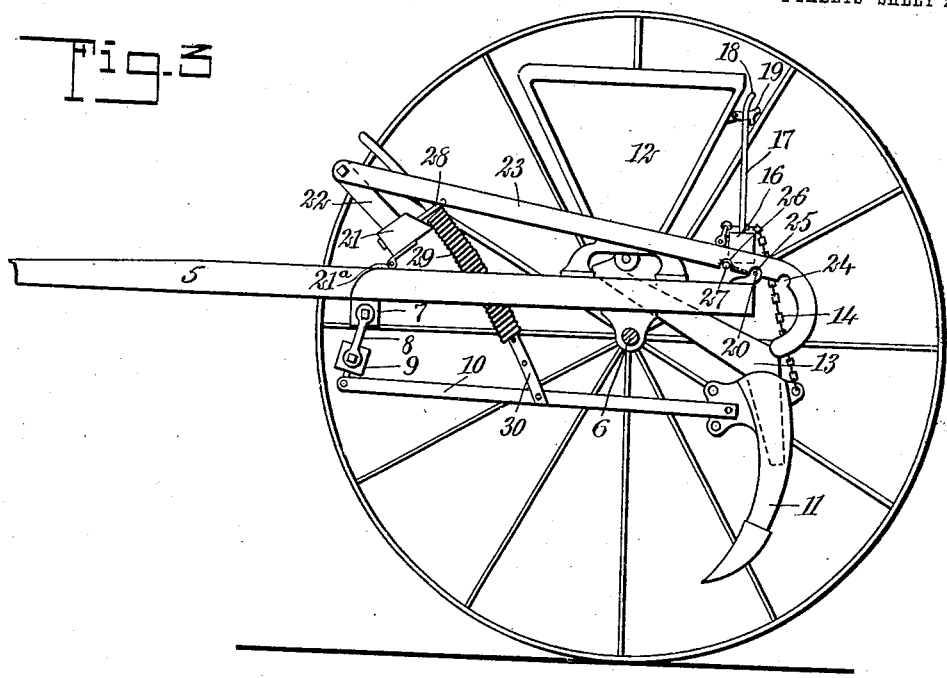
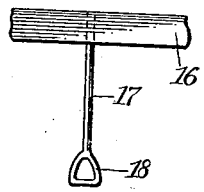
WITNESSES
INVENTOR
William F. Jacobs
BY Munn & Co
ATTORNEYS.

ated depth, this view further showing all parts in their respective normal positions while the machine is in action; Fig. 2 is a plan view of the mechanism shown in Fig. 1; Fig. 3 is a side elevation, somewhat similar to Fig. 1 but showing the drill teeth as raised out of engagement with the soil, and other parts of the machine in condition for movement over the ground without disturbing the soil; and Fig. 4 is a fragmentary elevation showing in detail the stirrup and lifting beam used for pulling upon the several chains carrying the drill teeth, for the purpose of elevating them out of engagement with the soil.

UNITED STATES PATENT OFFICE.

WILLIAM FRED JACOBS, OF OKAWVILLE, ILLINOIS.

ADJUSTING DEVICE FOR GRAIN-DRILLS.

No. 914,843.

Specification of Letters Patent.

Patented March 9, 1909.

Application filed January 22, 1908. Serial No. 412,105.

*To all whom it may concern:*

Be it known that I, WILLIAM F. JACOBS, a citizen of the United States, and a resident of Okawville, in the county of Washington and State of Illinois, have invented a new and Improved Adjusting Device for Grain-Drills, of which the following is a full, clear, and exact description.

My invention relates to grain drills, my more particular object being to enable the operator to adjust the depth of the drill teeth, and consequently regulate the depth within the soil to which the seeds are carried.

My invention further relates to means whereby a number of related parts upon the same machine may all be moved in unison for the purpose above indicated, thus saving a multiplicity of separate movements of various parts.

Reference is to be had to the accompanying drawings forming a part of this specification, in which similar characters of reference indicate corresponding parts in all the figures.

Figure 1 is a side elevation partly in section, showing the drill teeth occupying their lowermost position and subjected to spring pressure for the purpose of forcing them into the ground to a predetermined depth, this view further showing all parts in their respective normal positions while the machine is in action; Fig. 2 is a plan view of the mechanism shown in Fig. 1; Fig. 3 is a side elevation, somewhat similar to Fig. 1 but showing the drill teeth as raised out of engagement with the soil, and other parts of the machine in condition for movement over the ground without disturbing the soil; and Fig. 4 is a fragmentary elevation showing in detail the stirrup and lifting beam used for pulling upon the several chains carrying the drill teeth, for the purpose of elevating them out of engagement with the soil.

A tongue is shown at 5 and an axle at 6. A cross beam 7 is supported by the shaft and is rigid in relation thereto. Links 8 are connected with the cross beam 7, and hanging upon these links is another cross beam 9, the latter having a certain limited motion because of its swinging connection. Rods or drag bars 10 are pivotally connected with the cross beam 9 and support drill teeth 11, each having the usual horn-like conformity suitable for depositing grain in the manner heretofore known.

A seed hopper is shown at 12 and grain chutes at 13, the latter leading down to the drill teeth. Chains 14 are connected with the drill teeth and are supported from eyes 15, these eyes being secured to a lifting bar 16. An arm 17 is connected rigidly with the middle of this lifting bar and normally hangs directly downward therefrom. Mounted or formed upon the free end of the arm 17 is a stirrup 18. A latch 19 is pivotally connected with the hopper 12 and may be raised slightly when engaged by the stirrup 18 so as to engage said stirrup, as indicated more particularly in Fig. 4.

The lifting bar 16 is journaled at 20 upon the framework and is free to swing in a plane crossing the general direction of the length of the lifting bar. Mounted above the cross beam 7 is a swinging bar 21 secured to the framework by pivotal connections 21ª. Extending upwardly from the swinging bar 21 are pivot rods 22 and pivotally connected with each of these rods is an adjusting bar 23 provided upon its under side with notches 24, 25, 26. Pins 27 are connected with the lifting bar 16 and are adapted to enter the notches 24, 25, 26, as the adjusting bar 23 is moved upwardly and forwardly, or downwardly and backwardly, as the case may be. The adjusting bars 23 may thus be raised and moved forward or backward so as to shift the notches 24, 25, 26 relatively to the pins 27. In doing this the pivot rods 22 are inclined to a greater or lesser extent, the swinging bar 21 turning upon its journals 21ª to a corresponding extent. The swinging bar 21 is provided with eyes 28 rigid therewith, and engaging these eyes and extending obliquely downward therefrom are spiral springs 29. Mounted within each spiral spring 29 is a rod 30 provided with holes 31 into which fit pins 32. By moving the pins from one of the holes 31 to another, the tension of the spring 29 is regulated at will. When the swinging bar 21 is moved upwardly and forwardly, as above described, the tension upon all of the spiral springs 29 is relieved.

The operation of my device is as follows: In order for the machine to operate without disturbing the soil, or in other words, for it to be drawn along after the manner of a vehicle, the operator grasps the arm 17 and moves it backwardly, upwardly and forwardly, so as to bring the stirrup 18 into engagement with the latch 19. This latch passes through the stirrup and engages it in such a position as to hold the latter. This movement of the rod 17 is necessarily accompanied by a corresponding movement of the lifting rod 16, the latter being raised bodily a little distance and at the same time turning a half revolution. This winds up the chains 14 and lifts all of the drill teeth 11 together with the rods or drag bars 10 connected thereto. The links 8 allow considerable freedom, so that no difficulty is encountered in making this movement. To bring the drill teeth into engagement with the earth, the reverse movement takes place, the operator simply releasing the latch 19 from the stirrup 18 and permitting the lifting rod 16 to turn and descend, so as to lower the chains 14. The operator adjusts the tension of the springs 29 so as to regulate the entrance of the drill teeth 11 into the ground. To do this, he moves the pins 32 from one of the holes 31 to another in the rod 30, as above described, so as to regulate the tension of the spiral springs 29. In doing this he can make the tension of one spiral spring 29 greater than that of another, or in other words, the spiral springs 29 may be adjusted independently of each other. When, however, he turns the rod 17 into such position that the stirrup 18 engages the latch 19, all of the adjusting rods 23 are pushed forward, the pivot rods 22 are inclined forwardly and the swinging rod 21 is tilted so that the tension of all of the spiral springs 29 is instantly removed.

I do not limit myself to the exact shape or conformity of any part shown; neither do I limit myself to any special use for which the apparatus may be employed, the scope of my invention being commensurate with my claims.

Having thus described my invention, I claim as new and desire to secure by Letters Patent:

1. The combination with the frame, drag-bars to which drill teeth are attached, a swinging beam on the frame, flexible connections between the drag-bars and beam, a second swinging beam provided at spaced intervals with loops, arms projecting upwardly from the drag-bars through the loops, pins traversing the arms, and springs arranged between the pins and the loops, and means for swinging said beam to move the loops whereby to vary the tension of the springs.

2. The combination of drill teeth, a swinging beam mounted thereover, flexible connections from said drill teeth to said swinging beam, drag bars connected with said drill teeth and movable therewith, separate spring mechanisms for controlling each of said drag bars, a swinging bar provided with mechanism for engaging said spring mechanisms, a pivot rod mounted upon said swinging beam, an adjusting bar journaled upon said pivot rod, and means for holding said connecting bar and said swinging beam in various predetermined positions relatively to each other or in unison.

3. The combination of drill teeth, a swinging beam mounted thereover, flexible connections from said drill teeth to said swinging beam, an arm connected with said swinging beam and provided with a stirrup, and a latch disposed partially within the path of said stirrup for the purpose of holding the latter in a predetermined position.

In testimony whereof I have signed my name to this specification in the presence of two subscribing witnesses.

WILLIAM FRED JACOBS.

Witnesses:
JOHN FIETSAM,
CONRAD FISCHER.